March 17, 1931.   S. S. ROBERTS   1,796,808
FLUID VALVE
Filed June 30, 1928
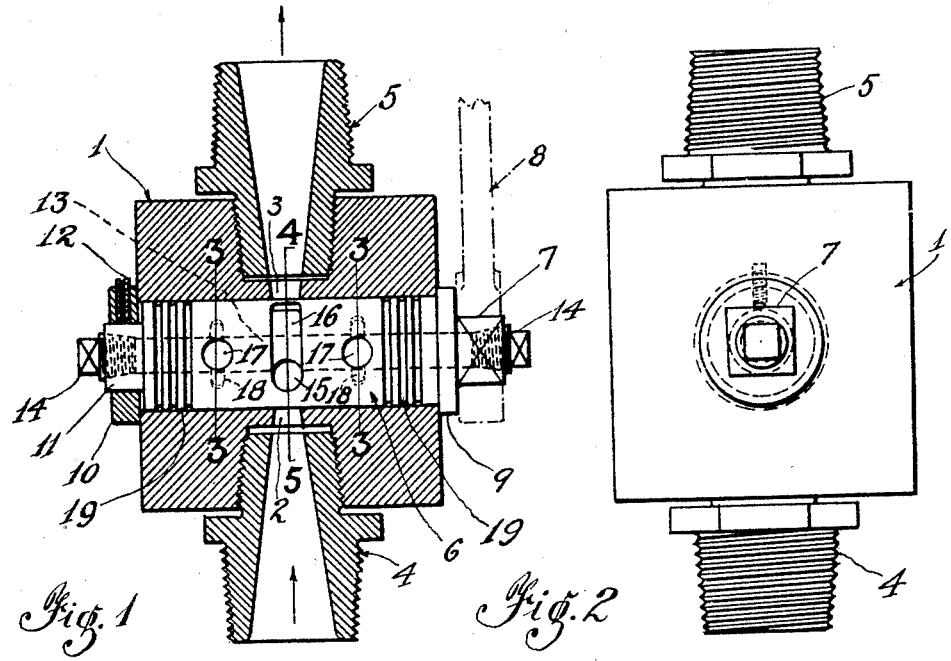
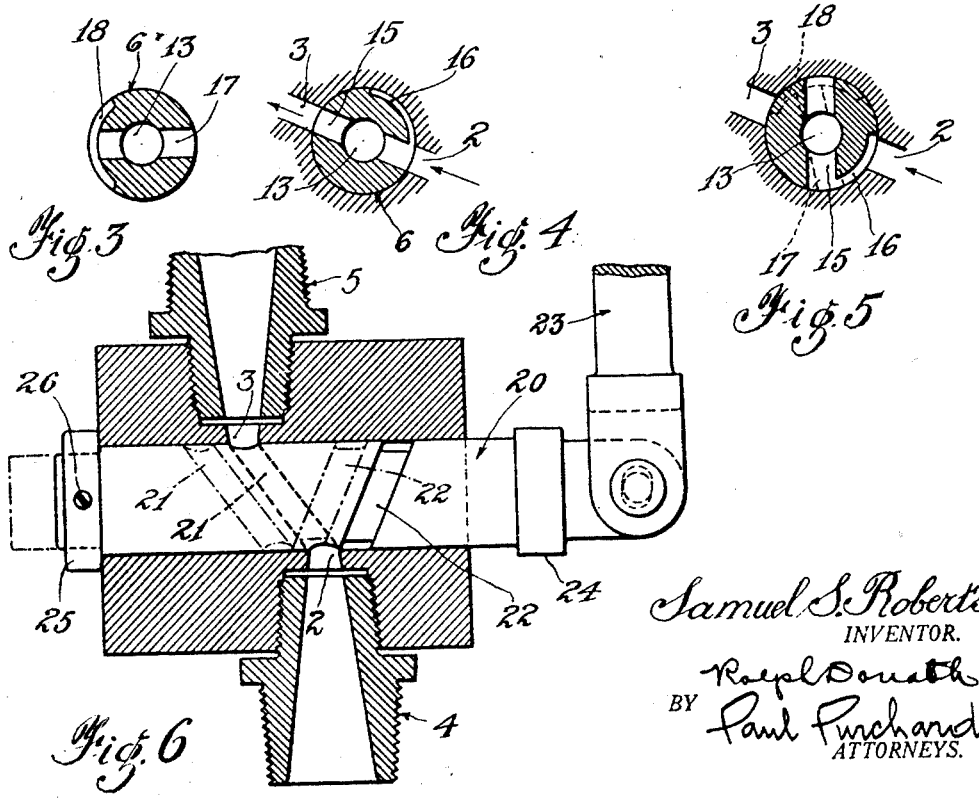
Samuel S. Roberts
INVENTOR.
BY Ralph Donath
Paul Purchard
ATTORNEYS.

Patented Mar. 17, 1931

1,796,808

UNITED STATES PATENT OFFICE

SAMUEL S. ROBERTS, OF PITTSBURGH, PENNSYLVANIA

FLUID VALVE

Application filed June 30, 1928. Serial No. 289,357.

This invention relates to fluid-valves and more in particular to a type of valves known in the trade as plug-valves.

The primary object of this invention is to provide means whereby the pressure of the fluid controlled by the valve when closed, will act on both sides of the plug, thus equalizing the pressures and making the operation of the valve quite easy regardless of the pressure of the fluid. A further object is to provide a plug-valve which may be cleaned very quickly and easily. Still another object is to provide a plug-valve, having the above mentioned features, which is extremely simple in construction and which, therefore, can be manufactured at relatively low cost. Additional features and advantages of this invention will appear from the following description considered in connection with the accompanying drawing forming a part of this application.

In the drawing:

Fig. 1 is a longitudinal section showing a plug-valve of the rotary type.

Fig. 2 is an end view of Fig. 1.

Fig. 3 represents a cross-section taken through the plug of the valve on lines 3—3 in Fig. 1.

Fig. 4 is a similar section taken on line 4—5 when the valve is fully open.

Fig. 5 is a section taken on line 4—5 when the valve is closed.

Fig. 6 is a longitudinal section showing a plug-valve of the sliding type also provided with pressure equalizing means.

The rotary plug-valve shown in Figs. 1 to 4 is my preferred construction and is intended to be used in combination with a high pressure grease-lubricating system for roll neck bearings in particular in which the pressures used may vary from several hundred pounds to over one thousand pounds per square inch. Therefore, the parts exposed to such high pressure have been made accordingly strong and massive. This valve consists of the heavy body 1 in which are drilled the inlet port 2 and the diametrically opposed outlet port 3, both ports being connecting to a piping system by means of the conically bored inlet bushing 4 and the outlet bushing 5 screwed into the body. The body is accurately bored longitudinally to receive the closely fitting rotary plug 6 having at one end a square shank 7 to which is secured an operating lever 8, of any desired design. This plug is held in the proper position in the body by means of a shoulder or flange 9 and by the collar 10 placed on the reduced end 11 of the plug and held thereon by a set screw 12. A longitudinal hole 13 is drilled right through the center of the valve-plug and both ends of said hole are closed by means of the pipe plugs 14.

The inlet and outlet ports 2 and 3 may be brought in communication by means of the valve-port 15 drilled diametrically through the valve plug. At the inlet end of this port there is cut on the periphery of the plug the distribution groove 16 of ample length to suit the operative conditions of the valve, which will be explained hereafter. At both sides of the valve-port 15 are drilled diametrically through the valve-plug the two equalizer ports 17 having at the outlet ends thereof the equalizer grooves 18 arranged substantially diametrically opposite the distribution groove 16, and having preferably the same length and but one half the width, so that the sum of their peripheral area will be equal to that of the distribution groove 16. To prevent leaks along the valve plug the latter is preferably provided adjacent both ends with groups of sealing grooves 19. The valve-plug may be easily cleaned out by simply removing the plugs 14 and passing a wire through the hole 13, as will be readily understood.

The operation of the rotary valve is as follows:

When the valve is in the fully closed position shown in Fig. 5, the fluid under pressure will flow along the distribution groove 16, enter the valve port 15, engage the equalizer ports 17 and finally fill up the equalizer-grooves 18. The fluid pressure exerted on the outlet side of the plug will be equal to the pressure on the inlet side and the valve plug will be practically in a floating condition within the body. The frictional resistance between the valve body and the valve-plug is therefore, practically eliminated, and the latter may be operated with very little effort.

When the valve is fully opened, as shown in Fig. 4, the frictional resistance due to the fluid pressure acting on the valve-plug will, of course, be very small because of the direct communication between the inlet and outlet ports 2 and 3 through the valve port 15. However, any pressure exerted by the fluid on the inlet side of the valve-plug will be compensated by the fluid pressure acting, through the medium of the equalizer ports and grooves, on the outlet side of the valve-plug.

The equalization of the pressures on both sides of the valve-plug will be maintained for all intermediate positions in which the valve-plug may be rotated by the operating lever 8.

It will be readily understood that the fluid pressure exerted on a valve plug not provided with the equalizing features described above would render the opening of a closed valve very difficult when dealing with fluid pressures of great magnitude. It is because of this lack of pressure-equalization, that it is often necessary to strike heavy hammer blows on a closed plug-valve in order to open it.

As stated, Fig. 6 illustrates a modified embodiment of my invention applicable to sliding plug-valves. The valve body differs from the one above described in that the inlet and outlet ports 2 and 3, together with their bushings 4 and 5, are offset instead of being in direct axial alignment.

The slidable valve-plug 20 has an oblique valve port 21 which connects the inlet and outlet ports 2 and 3 together when the valve is open. Beginning adjacent the inlet end of the valve port is the equalizer groove 22 cut all around the periphery of the valve plug and inclined in opposite direction to the valve port. The valve-plug may be reciprocated in the valve-body by means of a rockable operating lever 23, and sliding movements of the plug are limited by the shoulder 24 and the collar 25 secured in any desired manner, such as by the set-screw 26, on the other end of the valve-plug.

To fully shut the valve, the plug is shifted to the left to the limit into the position partly indicated in dot and dash lines. It will be seen from the drawing that, when in this position, the equalizer-groove will still be in communication with the inlet port 2. Therefore, the fluid under pressure will act all around the equalizer groove and maintain the valve plug in a floating condition which reduces the friction due to the fluid-pressure to practically nothing. At all intermediate positions between full open and full closed, the equalizer groove 22 will always distribute the fluid pressure equally around the valve-plug, and hence reduce friction.

While in Fig. 1 I have shown a rotary valve with two equalizer ports disposed at each side of the valve-port 15, the number of equalizer ports could be varied to suit the size of the valve. Also many changes in the precise construction, arrangement and combination of the various parts may be made without exceeding the scope of the claims and I reserve the liberty of making all such changes as may be thought desirable.

I claim:—

1. In a fluid valve comprising a valve body, an inlet port and an outlet port, a hollow rotatable valve-plug closed at both ends and extending beyond both sides of the valve-body and having a valve-port adapted to connect the inlet and outlet ports and a distribution groove disposed circumferentially on the plug and in communication with the inlet end of the valve port; said plug having also a plurality of equalizer ports disposed in spaced relation with and on both sides of said valve port; said equalizer ports having at their outlet ends equalizer grooves disposed in diametrally opposite relation with the distribution groove and having collectively substantially the same circumferential area as the distribution groove.

2. In a fluid valve comprising a valve-body, an inlet port and an outlet port, a rotatable valve-plug extending beyond both sides of the valve-body and having a central aperture extending longitudinally therethrough; said valve-plug having a diametrally disposed valve port adapted to connect the inlet and outlet ports together and a distribution groove disposed circumferentially on the plug and in communication with the inlet end of the valve port; said plug having also a plurality of equalizer ports disposed in spaced relation with and on both sides of said valve port; said equalizer ports having at their outlet ends equalizer grooves disposed in diametrically opposite relation with the distribution groove and having collectively substantially the same circumferential area as the distribution groove; sealing means formed integrally with the valve-plug and positioned at both ends thereof and within the valve-body, and removable means for closing both ends of the longitudinal aperture in said valve-plug.

3. In a fluid valve comprising a valve-body, an inlet port and an outlet port, a hollow rotatable valve-plug closed at both ends and extending beyond both sides of the valve-body and having a valve-port adapted to connect the inlet and outlet ports and a distribution groove disposed circumferentially on the plug and in communication with the inlet end of the valve port; said plug having also at each side of the valve-port a diametral equalizer port having at its outlet end an equalizer groove of substantially one-half the circumferential area of the distribution groove.

In testimony whereof I affix my signature.

SAMUEL S. ROBERTS.